(12) United States Patent
Hampton

(10) Patent No.: US 8,086,608 B2
(45) Date of Patent: Dec. 27, 2011

(54) MANAGEMENT OF RESOURCE IDENTIFIERS

(75) Inventor: Mark Carl Hampton, Newtown (AU)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 11/871,794

(22) Filed: Oct. 12, 2007

(65) Prior Publication Data

US 2009/0100085 A1    Apr. 16, 2009

(51) Int. Cl.
*G06F 17/30* (2006.01)
(52) U.S. Cl. .......................... 707/737; 707/803
(58) Field of Classification Search .................. 707/803, 707/999.1, 737
See application file for complete search history.

(56) References Cited

U.S. PATENT DOCUMENTS

| | | |
|---|---|---|
| 5,140,692 A | 8/1992 | Morita |
| 5,371,807 A | 12/1994 | Register et al. |
| 5,732,259 A | 3/1998 | Konno |
| 6,243,723 B1 | 6/2001 | Ikeda et al. |
| 7,003,442 B1 | 2/2006 | Tsuda |
| 7,168,034 B2 * | 1/2007 | Hennings et al. ............. 715/205 |
| 7,181,438 B1 * | 2/2007 | Szabo .................................. 1/1 |
| 7,321,889 B2 * | 1/2008 | Smadja et al. ....................... 1/1 |
| 2004/0093562 A1 | 5/2004 | Diorio et al. |
| 2007/0033221 A1 * | 2/2007 | Copperman et al. ...... 707/103 R |
| 2007/0094241 A1 * | 4/2007 | Blackwell et al. ................ 707/3 |
| 2007/0136318 A1 | 6/2007 | Clark et al. |

* cited by examiner

*Primary Examiner* — Cam Truong
(74) *Attorney, Agent, or Firm* — Patterson & Sheridan, LLP

(57) ABSTRACT

Method, system, and computer program product for managing resource identifiers are provided. The method provides for creating a hierarchical taxonomy for a plurality of resource identifiers, the hierarchical taxonomy being based on a plurality of tags and one or more hierarchical relationships among the plurality of tags, categorizing the plurality of resource identifiers in accordance with the hierarchical taxonomy, building a hierarchical view of the plurality of resource identifiers based on categorization of the plurality of resource identifiers in accordance with the hierarchical taxonomy, and displaying the hierarchical view of the plurality of resource identifiers.

13 Claims, 5 Drawing Sheets

MANAGEMENT OF RESOURCE IDENTIFIERS

BACKGROUND

Resource identifiers, such as uniform resource identifiers, are often catalogued (e.g., bookmarked). Tags, such as keywords, are sometimes associated with a resource identifier and stored along with the resource identifier. Each tag, however, is usually considered to be unrelated to any other tags. Thus, if resource identifiers are categorized based on tags associated with the resource identifiers, then each tag will only correlate to a single category. As a result, any categorized view of resource identifiers will be flat (e.g., without any relationships between the categories).

SUMMARY

Method, system, and computer program product for managing resource identifiers are provided. In one implementation, the method provides for creating a hierarchical taxonomy for a plurality of resource identifiers, the hierarchical taxonomy being based on a plurality of tags and one or more hierarchical relationships among the plurality of tags, categorizing the plurality of resource identifiers in accordance with the hierarchical taxonomy, building a hierarchical view of the plurality of resource identifiers based on categorization of the plurality of resource identifiers in accordance with the hierarchical taxonomy, and displaying the hierarchical view of the plurality of resource identifiers.

DETAILED DESCRIPTION

This disclosure generally relates to management of resource identifiers. The following description is provided in the context of a patent application and its requirements. Accordingly, this disclosure is not intended to be limited to the implementations shown, but is to be accorded the widest scope consistent with the principles and features described herein.

A resource identifier, such as a uniform resource identifier (URI), an internationalized resource identifier (IRI), or the like, can be used to identify or name a resource. Examples of resources include web pages, email addresses, documents, files, and so forth. Certain types of resource identifiers, such as uniform resource locator (URLs), can be used to locate resources. A resource identifier may be in the form of a string of characters (e.g., www.example.com, mailto:someone@example.com, and so forth).

Resource identifiers are often catalogued (e.g., bookmarked). When a resource identifier is catalogued, tags may be associated with the resource identifier and stored along with the resource identifier. Tags associated with a resource identifier typically relate to a resource identified by the resource identifier. Examples of tags include keywords, attributes, descriptions, and so forth, of a resource identified by a resource identifier with which the tags are associated. Tags associated with each resource identifier, however, usually have no relationships between them. As a result, if resource identifiers are categorized based on tags associated with the resource identifiers, then any view of the categorized resource identifiers will be flat because each tag will only correlate to a single category.

Figure 1:
FIG. 1 depicts a sample view of resource identifiers.

Depicted in FIG. 1 is a sample view 100 of resource identifiers 102-110. Resource identifier 102 identifies a web page about German Shepherd dogs, resource identifier 104 identifies a web page about different types of animal, resource identifier 106 identifies a file about various types of dogs, resource identifier 108 identifies a web page about dogs in general, and resource identifier 110 identifies a document about German Shepherds.

Tags (not shown) associated with resource identifiers 102 and 110 include German Shepherds, dogs, and animals. An animals tag (not shown) is associated with resource identifier 104. Resource identifiers 106 and 108 are associated with a tag on animals (not shown) and a tag on dogs (not shown). Resource identifiers 102-110 have been categorized based on the tags associated with resource identifiers 102-110.

As depicted in FIG. 1, sample view 100 of resource identifiers 102-110 includes three categories—'ANIMALS' 112, 'DOGS' 114, and 'GERMAN SHEPHERDS' 116, which correlate to the tags (not shown) associated with resource identifiers 102-110. There are no relationships between categories 112-116 since the tags associated with resource identifiers 102-110 have no relationships between them.

Sample view 100 is flat, even though resource identifiers 102-110 have been grouped according to categories 112-116, because categories 112-116 have no relationships with one another. Each of the resource identifiers 102-110 is displayed in each category 112-116 corresponding to a tag associated with the resource identifier. As a result, some of resource identifiers 102-110 appear multiple times (e.g., resource identifiers 102 and 106-110).

Having a resource identifier displayed in multiple categories may not be very useful or helpful because as the number of resource identifiers increase, it will be harder to see which resource identifiers are really directed to a particular category. For example, if a user is looking for resources concerning animals in general, then only resource identifier 104 identifies such a resource. With only four other resource identifiers listed under 'ANIMALS' category 112 in sample view 100, it is not too difficult to pick out resource identifier 104. However, if more resource identifiers were listed under category 112, then it may not be so easy to pick out resource identifier 104.

Figure 2:
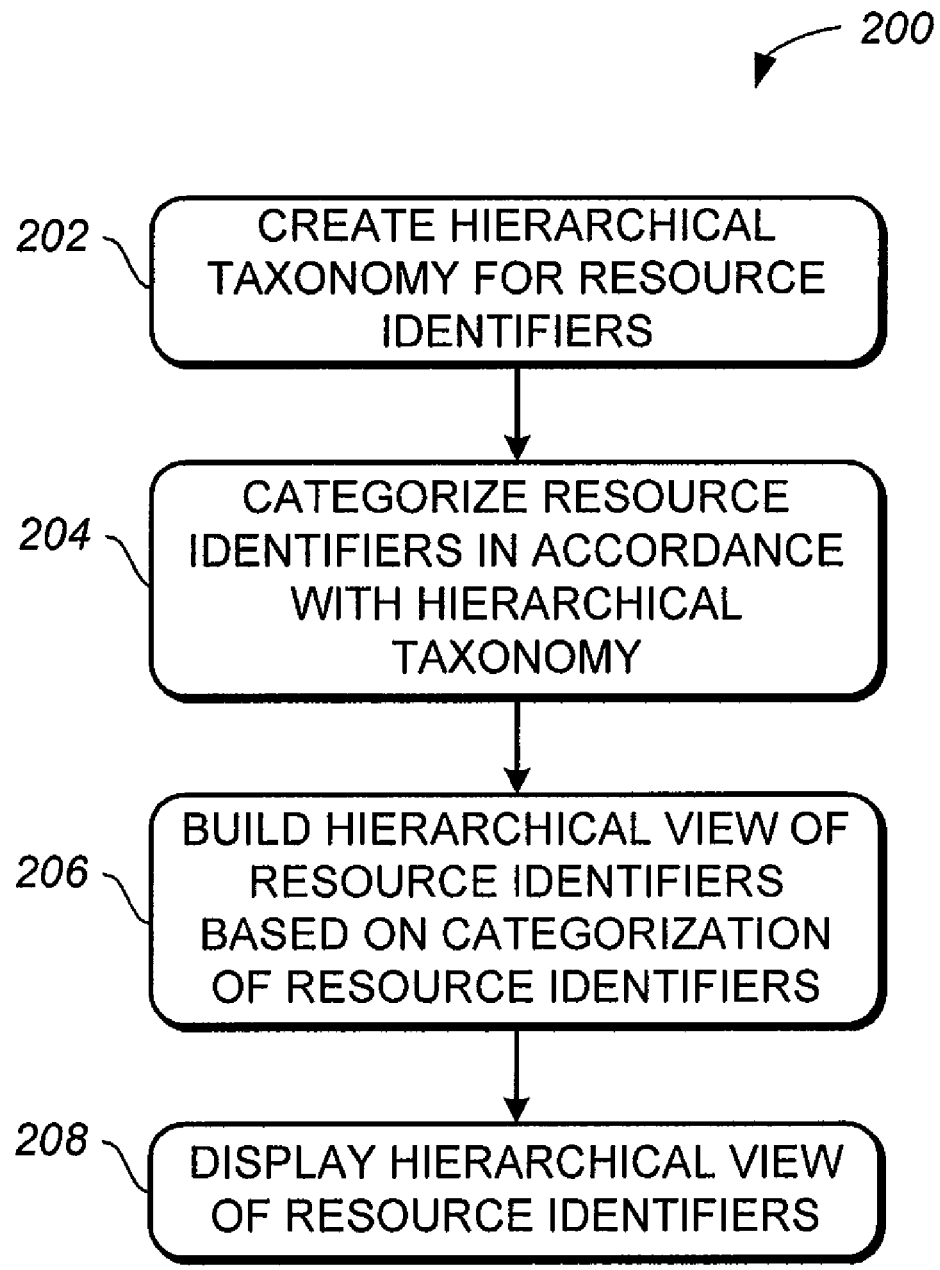
FIG. 2 illustrates a process for managing resource identifiers according to an implementation.

FIG. 2 illustrates a process 200 for managing resource identifiers according to an implementation. At 202, a hierarchical taxonomy is created for a plurality of resource identifiers. The hierarchical taxonomy is based on a plurality of tags. Each of the plurality of tags is associated with at least one of the plurality of resource identifiers and relates to a resource identified by the at least one resource identifier.

In one implementation, at least one of the plurality of tags is a keyword of the resource identified by the at least one resource identifier associated with the at least one tag. A tag may also be an attribute, a description, or the like of the resource identified by the at least one resource identifier associated with the tag.

One or more of the plurality of resource identifiers may be uniform resource identifiers (URLs). Hence, each of the one or more resource identifiers specifies a location of the resource identified by the resource identifier. In one implementation, one or more resources identified by one or more of the plurality of resource identifiers are web pages.

The hierarchical taxonomy is also based on one or more hierarchical relationships among the plurality of tags. In one implementation, the one or more hierarchical relationships among the plurality of tags are provided along with one or more of the plurality of tags.

For example, suppose a resource identifier is a URL and a resource identified by the URL is a web page on Ford Mustang cars. In addition, suppose tags relating to the web page are 'motor vehicle', 'automobile', 'Ford', and 'Mustangs'. A host of the web page can communicate the tags relating to the web page and hierarchical relationships between the tags by providing a path that includes the tags relating to the web page in hierarchical order, separated by delimiters (e.g., slashes, dashes, or the like) to indicate each hierarchical level. The path for the Ford Mustangs web page may be 'motor vehicle/automobile/Ford/Mustangs'.

At 204, the plurality of resource identifiers is categorized in accordance with the hierarchical taxonomy. A hierarchical view of the plurality of resource identifiers is built at 206 based on categorization of the plurality of resource identifiers in accordance with the hierarchical taxonomy. At 208, the hierarchical view of the plurality of resource identifiers is displayed.

Figure 3:
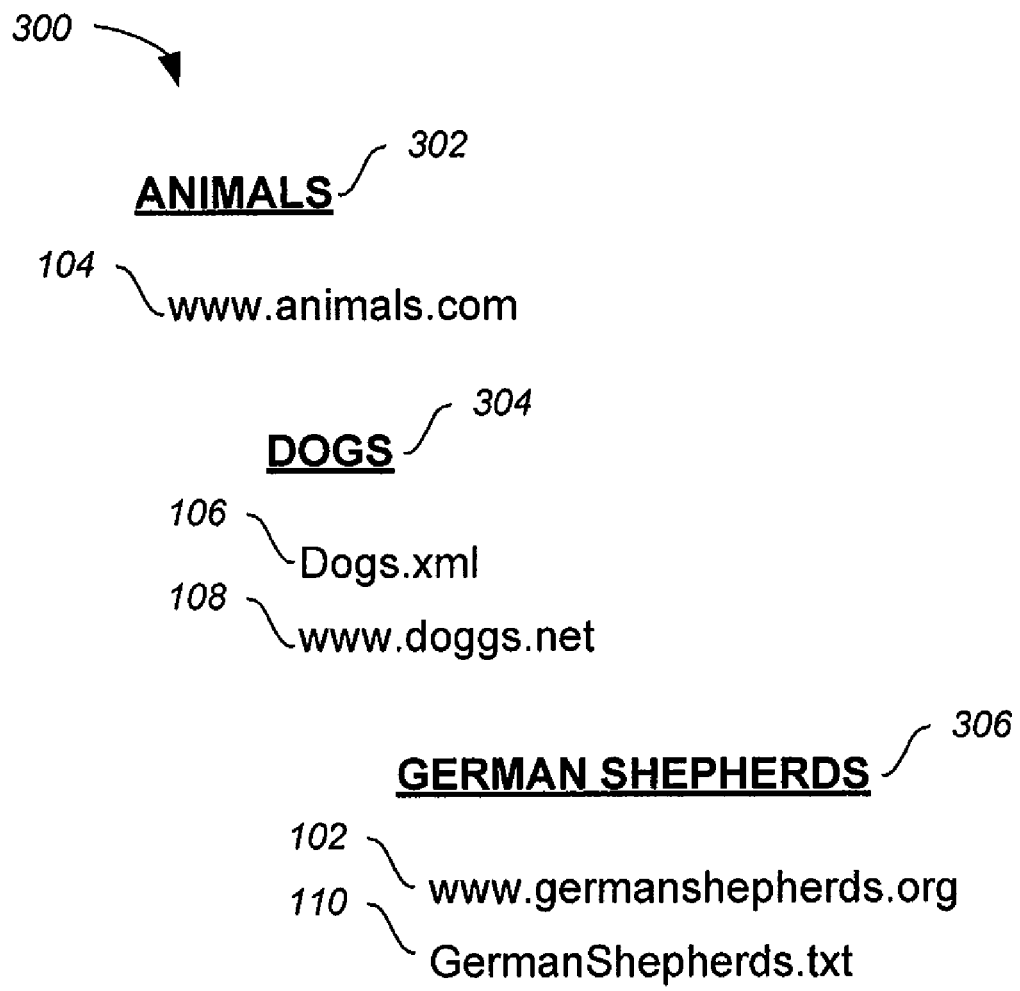
FIG. 3 shows a hierarchical view of resource identifiers according to an implementation.

Shown in FIG. 3 is a hierarchical view 300 of resource identifiers 102-110 in FIG. 1 according to an implementation. As discussed above, each of the tags 'animals', 'dogs', and 'German Shepherds' are associated with one or more of resource identifiers 102-110. It is clear from hierarchical view 300 that the hierarchical relationships among the tags can be expressed as a path 'animals/dogs/German Shepherds'. This path may be provided by, for instance, a host of the web page identified by resource identifier 102.

Hierarchical view 300, like sample view 100 includes three categories—'ANIMALS' 302, 'DOGS' 304, and 'GERMAN SHEPHERDS' 306, each of which correlate to one of the tags associated with resource identifiers 102-110. Because of the hierarchical relationships among the tags have been provided, 'DOGS' category 304 is now a sub-category of 'ANIMALS' category 302. In addition, 'GERMAN SHEPHERDS' category 306 is now a sub-category of 'DOGS' category 304.

Thus, each resource identifier 102-110 in hierarchical view 300 does not appear in every category or sub-category that correlates to a tag associated with the resource identifier, unlike in sample view 100. As seen in FIG. 3, resource identifiers 102 and 110 only appear under sub-category 306, resource identifiers 106 and 108 only appear under sub-category 304, and resource identifier 104 only appears under category 302. In comparison to sample view 100, users should find it easier to locate resource identifiers that truly relate to the category or sub-category of interest in hierarchical view 300.

Some tags, such as 'Mustangs', may have hierarchical relationships to completely different tags, such as 'automobiles' and 'Ford' versus 'animals' and 'horses'. With a non-hierarchical view, a resource identifier identifying a resource relating to Ford Mustang cars and a resource identifier identifying a resource relating to Mustang horses will be grouped together. This may make it difficult for users to determine which resource identifier really identifies a resource of interest without actually viewing the resource. With a hierarchical view, however, a user can easily distinguish resource identifiers that identify resources relating to Ford Mustang cars from resource identifiers that identify resources relating to Mustang horses.

As more and more resource identifiers are catalogued and categorized for a particular user, the hierarchical taxonomy created should be a representation of a taxonomy of the user's interests, grouped accordingly. Therefore, hierarchical taxonomies created for resource identifiers catalogued for different users may become user-specific taxonomies.

Figure 4:
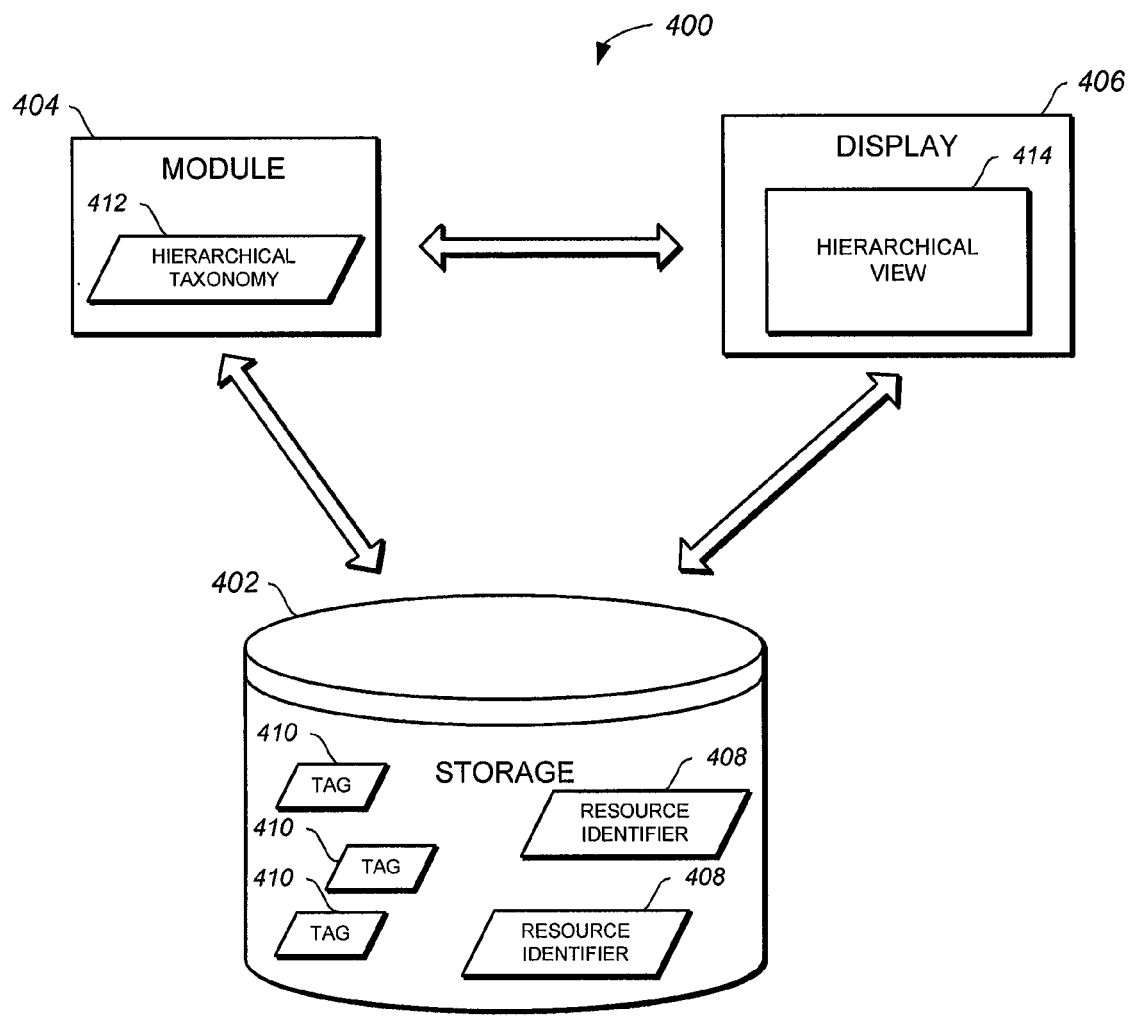
FIG. 4 depicts a system for managing resource identifiers according to an implementation.

FIG. 4 depicts a system 400 for managing resource identifiers according to an implementation. System 400 includes a storage 402, a module 404, and a display 406. Storage 402 may be memory, hard disk, or the like. Module 404 may be a browser, a cataloguing application, or the like. Display 406 may be a liquid crystal display (LCD), a cathode ray tube (CRT) display, or the like. Although not depicted, system 400 may include other components, such as other storage(s), module(s), or the like.

Storage 402 stores resource identifiers 408 and tags 410. Each tag 410 is associated with at least one resource identifier 408 and relates to a resource (not shown) identified by the at least one resource identifier 408. Other data may be stored in storage 402, such as additional tags and/or resource identifiers.

Module 404, which is in communication with storage 402 and display 406, creates a hierarchical taxonomy 412 for resource identifiers 408 based on tags 410 and hierarchical relationship(s) among tags 410. In addition, module 404 categorizes resource identifiers 408 in accordance with hierarchical taxonomy 412 and builds a hierarchical view 414 of resource identifiers 408 based on categorization of resource identifiers 408. Display 406 then displays the hierarchical view 414 of resource identifiers 408.

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 5:
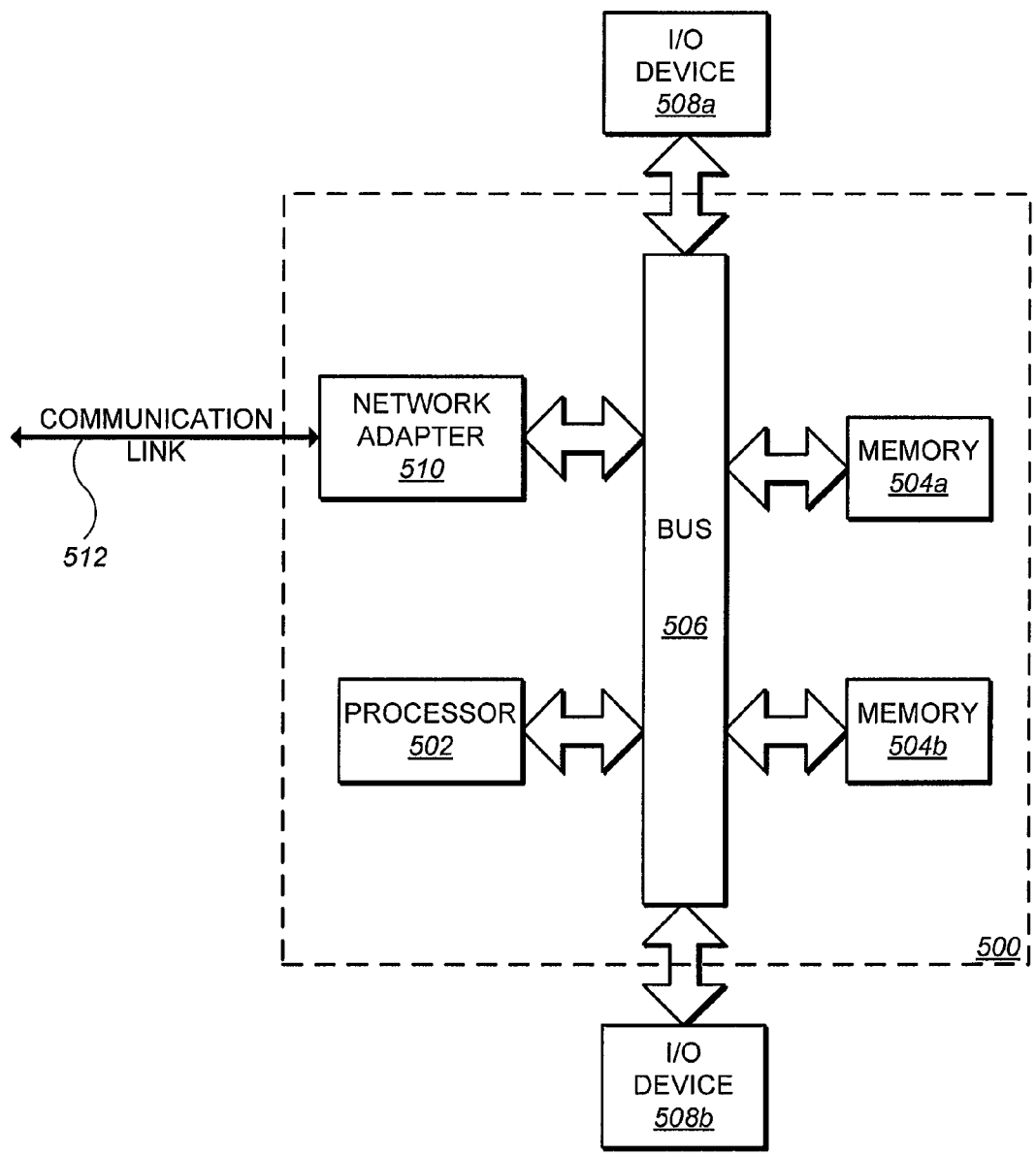
FIG. 5 is a block diagram of a data processing system with which various implementations can be implemented.

FIG. 5 depicts a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508*a-b* (including, but not limited to, keyboards, displays, pointing devices, etc.) are coupled to data processing system 500. I/O devices 508*a-b* may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for managing resource identifiers have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A method for managing resource identifiers, the method comprising:
   creating a hierarchical taxonomy for a plurality of resource identifiers, wherein one or more of the plurality of resource identifiers are uniform resource identifier (URLs), and the hierarchical taxonomy being based on
      a plurality of tags, each of the plurality of tags being associated with at least one resource identifier of the plurality of resource identifiers and relating to a resource identified by the at least one resource identifier associated with the tag, and
      one or more hierarchical relationships among the plurality of tags, wherein a first tag is superior to one or more second tags and each second tag of the one or more second tags comprises a sub-taxonomy of the first tag, and wherein the one or more hierarchical relationships among the plurality of tags are provided along with one or more of the plurality of tags;
   categorizing the plurality of resource identifiers in accordance with the hierarchical taxonomy by:
      not associating a first resource identifier with said each second tag of the one or more second tags, and
      associating first resource identifier with the first tag;
   building a hierarchical view of the plurality of resource identifiers based on categorization of the plurality of resource identifiers in accordance with the hierarchical taxonomy; and
   displaying the hierarchical view of the plurality of resource identifiers.

2. The method of claim 1, wherein one or more resources identified by one or more of the plurality of resource identifiers are web pages.

3. The method of claim 1, wherein at least one of the plurality of tags is a keyword of the resource identified by the at least one resource identifier associated with the at least one tag.

4. The method of claim 1, wherein the hierarchical taxonomy created represents a taxonomy of a plurality of interests of a user.

5. A system for managing resource identifiers, the system comprising:
   a storage for storing:
      a plurality of resource identifiers, wherein one or more of the plurality of resource identifiers are uniform resource identifier (URLs), and
      a plurality of tags, each tag of the plurality of tags being associated with at least one resource identifier of the plurality of resource identifiers and relating to a resource identified by the at least one resource identifier associated with the tag;
   a module in communication with the storage, the module configured for:
   creating a hierarchical taxonomy for the plurality of resource identifiers based on the plurality of tags and one or more hierarchical relationships among the plurality of tags, wherein a first tag is superior to one or more second tags and each second tag of the one or more second tags comprises a sub-taxonomy of the first tag, and wherein the one or more hierarchical relationships among the plurality of tags are provided along with one or more of the plurality of tags,
   categorizing the plurality of resource identifiers in accordance with the hierarchical taxonomy by:
      not associating a first resource identifier with said each second tag of the one or more second tags, and
      associating the first resource identifier with the first tag, and
   building a hierarchical view of the plurality of resource identifiers based on categorization of the plurality of resource identifiers in accordance with the hierarchical taxonomy; and
   a display displaying the hierarchical view of the plurality of resource identifiers.

6. The system of claim 5, wherein a resource identified by one or more of the plurality of resource identifiers are web pages.

7. The system of claim 5, wherein at least one of the plurality of tags is a keyword of the resource identified by the at least one resource identifier associated with the at least one tag.

8. The system of claim 5, wherein the hierarchical taxonomy created represents a taxonomy of a plurality of interests of a user.

9. The system of claim 5, wherein the module is a browser.

10. A non-transitory computer readable storage medium including a computer program for displaying data used to analyze system performance, wherein the computer program, when executed on a computer, causes the computer to:
   create a hierarchical taxonomy for a plurality of resource identifiers, wherein one or more of the plurality of resource identifiers are uniform resource identifier (URLs), and the hierarchical taxonomy being based on
      a plurality of tags, each tag of the plurality of tags being associated with at least one source identifier of the plurality of resource identifiers and relating to a resource identified by the at least one resource identifier associated with the tag, and
      one or more hierarchical relationships among the plurality of tags, wherein a first tag is superior to one or more second tags and each second tag of the one or more second tags comprises a sub-taxonomy of the first tag, and wherein at least one tag of the plurality of tags is a keyword of the resource identified by the at least one resource identifier associated with the at least one tag;

categorize the plurality of resource identifiers in accordance with the hierarchical taxonomy by:
  not associating a first resource identifier with said each second tag of the one or more second tags, and
  associating the first resource identifier with the first tag;
build a hierarchical view of the plurality of resource identifiers based on categorization of the plurality of resource identifiers in accordance with the hierarchical taxonomy; and
display the hierarchical view of the plurality of resource identifiers.

11. The medium of claim 10, wherein a resource identified by one or more of the plurality of resource identifiers are web pages.

12. The medium of claim 10, wherein the one or more hierarchical relationships among the plurality of tags are provided along with one or more of the plurality of tags.

13. The medium of claim 10, wherein the hierarchical taxonomy created represents a taxonomy of a plurality of interests of a user.

* * * * *